United States Patent [19]

Hollowed et al.

[11] Patent Number: 4,965,824
[45] Date of Patent: Oct. 23, 1990

[54] PAY STATION TELEPHONE AND DISPENSER FOR A COMMERCIAL CONVEYANCE

[75] Inventors: Edward J. Hollowed, Naperville; Jerome L. Oldani, Aurora, both of Ill.

[73] Assignee: GTE Airfone Incorporated, Oak Brook, Ill.

[21] Appl. No.: 278,392

[22] Filed: Feb. 27, 1989

[51] Int. Cl.$^5$ .................. H04M 1/11; H04M 17/02
[52] U.S. Cl. ................................. 379/428; 379/144; 379/455; 379/58
[58] Field of Search ............... 379/155, 144, 143, 428, 379/455, 58, 59

[56] References Cited

U.S. PATENT DOCUMENTS

| | | | |
|---|---|---|---|
| 4,437,814 | 6/1989 | Yoshino et al. | 379/144 |
| 4,727,569 | 2/1988 | Kutrieb et al. | 379/59 |
| 4,811,387 | 3/1989 | Hollowed et al. | 379/144 |
| 4,845,738 | 7/1989 | Takano et al. | 379/58 |

FOREIGN PATENT DOCUMENTS 0186749  10/1984  Japan ............................. 379/428

Primary Examiner—Stafford D. Schreyer

[57] ABSTRACT

For use in conjunction with vehicular, hand-held, pay telephones, a telephone dispenser and latching mechanism for securing the telephone in the dispenser and, in response to actuation by a telephone user, releasing the telephone from the dispenser. The dispenser includes an elongated dispenser channel of stepwise construction. The dispenser channel is enclosed at one end by a latch plate including a credit-card-actuated latching mechanism. The dispenser channel is enclosed at an opposite end by a face plate having an opening for the insertion and extraction of the telephone from the dispenser channel and a slot for the insertion of a credit-card. A latch-release actuator is located behind the face plate slot and is mechanically linked to the latching mechanism. A credit card, once inserted into the slot, causes the latching mechanism to disengage from the telephone, permitting an ejector mechanism to urge the telephone out of the dispenser. An included mounting arrangement fixes the telephone dispenser and its associated telephone to the passenger seat armrest of a commercial vehicle.

27 Claims, 3 Drawing Sheets

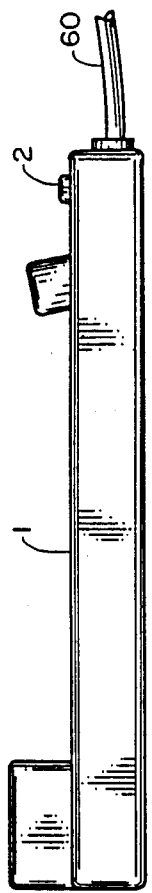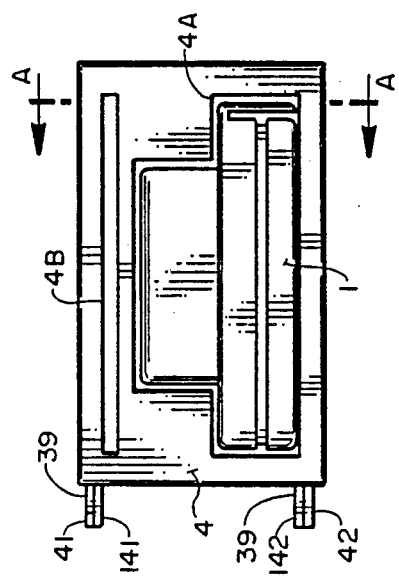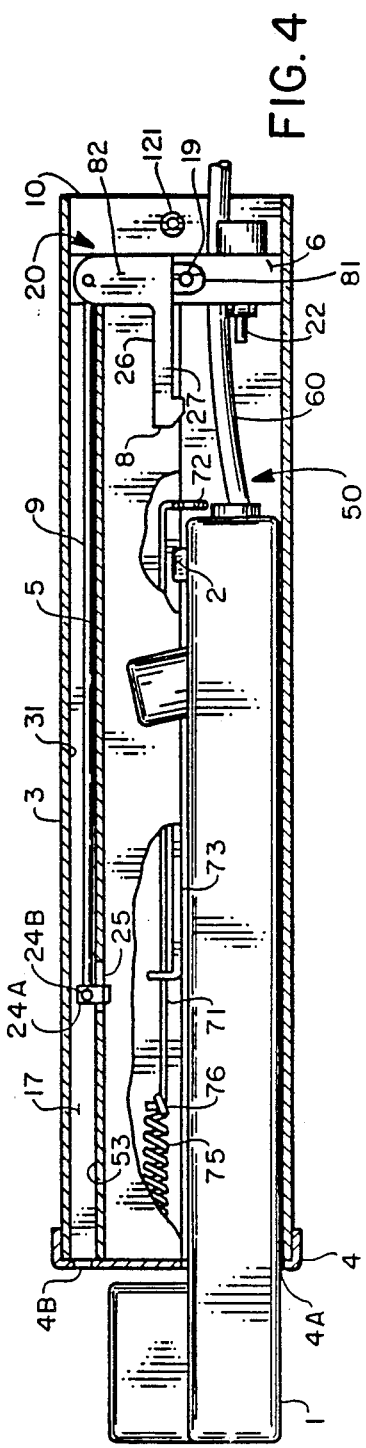

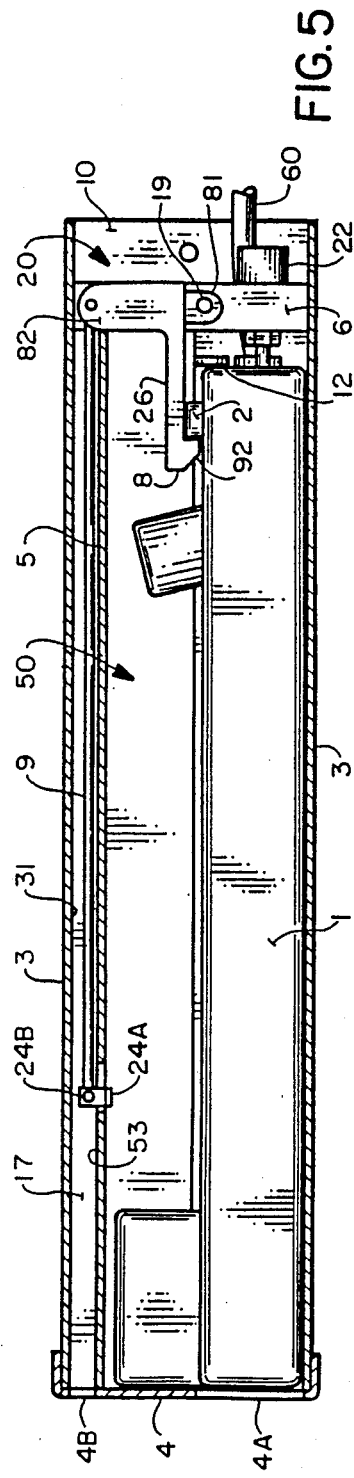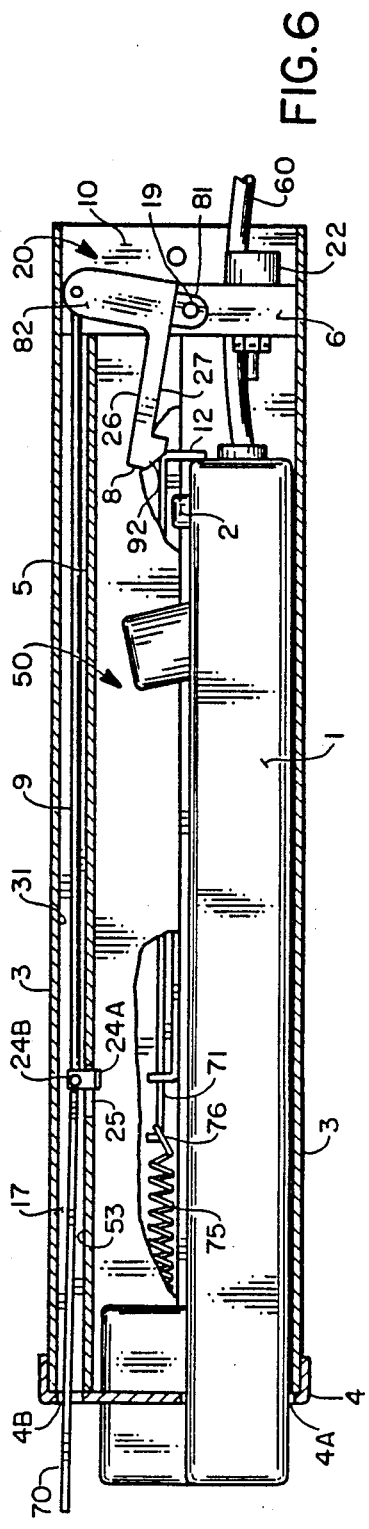

PAY STATION TELEPHONE AND DISPENSER FOR A COMMERCIAL CONVEYANCE

CROSS REFERENCE TO RELATED APPLICATIONS

Cross Reference is made to the related U.S. patent applications entitled "Holder and Credit-Card Unlatching Mechanism for a Hand-Held Telephone," application Ser. No. 138,182, filed Dec. 28, 1987, U.S. Pat. No. 4,811,387; and "Hand-Held Pay Telephone and Holder," application Ser. No. 138,172, filed Dec. 28, 1987, U.S. Pat. No. 4,881,254; and, "Dispenser And Unlatching Mechanism for a Hand-Held Pay Station Telephone," (Ser. No. 278,391); and, "A Hand-Held Pay Station Telephone Dispenser and Cord Retractor," (Ser. No. 278,393), the latter two applications filed on the same date, and by the same inventors as this application.

FIELD OF THE INVENTION

The present invention relates to the field of telephone pay stations and, more particularly, to a pay station telephone and dispenser adapted to be mountable to the armrest of a passenger seat found in a vehicle such as a commercial aircraft.

BACKGROUND OF THE INVENTION

Public pay telephones were introduced in the 1880s. In general, operation of such pay telephones required the deposit of a coin in order to unlock some mechanism, for example, the crank with which the user signalled the operator or a sliding door in front of the mouthpiece. On occasion, the entire telephone was enclosed in a locked box that could be opened only with the deposit of a coin, or a key. One arrangement reversed the usual scheme and enclosed the telephone in a booth having a door that locked behind the telephone user. After having made his call, the user could escape only by depositing a coin in the door lock. Only rarely did the early arrangements provide any means for refunding the user's payment in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which often the initial deposit of a single coin worked to signal the operator that a call was sought to be placed. Additional coins were added for payment of calls of longer duration or for calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including, ultimately, electronic totalizers that were able to count and accurately register the number and denomination of coins deposited. Such totalizers also facilitated the development and utilization of so-called single-slot pay stations, wherein a single slot accepted coins of various denominations, eliminating the traditional three-slot design that had been utilized for many years.

Pay telephones that accept credit cards represent a much more recent development that has found widespread use within the past decade. Such arrangements, typically found in airports, railroad stations, etc., have been well received by business travelers, largely because credit-card telephones mitigate the need to carry the many coins required to place telephone calls, particularly long-distance calls.

In the United States today, more people use public telephones more often than in any other country in the world, and the subsequent installation and adaptation of public telephones to different environments have been limited only by the imagination. As a result, significant experimentation has been done in connection with the deployment of pay telephones in other than conventional environments. The deployment of telephone pay stations on railcars, particularly on deluxe passenger trains, has been experimented with from time to time. However, the most recent development and adaptation of the pay station have permitted use in commercial aircraft. Credit-card-accepting pay stations have been incorporated into commercial aircraft where, by means of radio-telephone links, telephone service can be had by the user from the commercial aircraft to ground-based telephone equipment.

With regard to the placement of telephone pay stations on board commercial aircraft, the telephones themselves have typically been installed on bulkheads located adjacent to flight-attendant stations. This arrangement requires the user to leave his seat to go to the location of the on-board pay station to initiate the call. If the pay station is equipped with a wireless telephone unit, the flight attendant often becomes involved in providing the user with the hand-held telephone. Such arrangements fail to afford the convenience, and perhaps the privacy, that an aircraft passenger might desire in connection with the placement of a call.

Accordingly, it is an object of the present invention to provide a new and more effective telephone pay station for use on board in-flight commercial aircraft or in similar other vehicular environments where convenience of utilization and ready access facilitates and encourages use of such pay telephones.

DISCLOSURE OF THE INVENTION

The above and other objects, advantages, and capabilities are realized in the combination of a hand-held telephone and telephone dispenser for use aboard, for example commercial aircraft. The telephone includes a latch receiver located proximate the transmitter.

The telephone dispenser includes a telephone receiving cavity adapted to receive the telephone in response to the manual placement of the telephone within the cavity. A latch initially operated automatically interlockingly engages the telephone within the telephone receiving cavity. The telephone is released in response to the placement of an implement, such as a credit-card, against a latch-release actuator.

The dispenser further includes a first mounting bracket adapted to be mounted to a dispenser mounting bracket. The dispenser mounting bracket is fixed to the underside of a passenger seat armrest. Thereby, the telephone and telephone dispenser are effectively mounted to the passenger seat of a commercial aircraft were it may be easily used by a passenger.

BRIEF DESCRIPTION OF THE DRAWINGS

A better understanding of the invention may be had from the consideration of the following detailed description taken in conjunction with the accompanying drawings in which:

FIG. 2 is a perspective view of a hand-held pay station telephone, in accordance with the present invention.

FIG. 3 is a front plan view of the telephone dispenser, in accordance with the present invention.

FIG. 4 is a sectional view taken along lines A—A of FIG. 2, showing the installation of the hand-held pay station telephone in the telephone dispenser, in accordance with the present invention.

FIG. 5 is a sectional view taken along lines A—A of FIG. 2, showing the hand-held pay station telephone received and latched within the telephone dispenser, in accordance with the present invention.

FIG. 6 is a sectional view taken along lines A—A of FIG. 2, showing the unlatching and extraction of the hand-held pay station telephone from the telephone dispenser, in accordance with the present invention.

DESCRIPTION OF A PREFERRED EMBODIMENT

Figure 1:
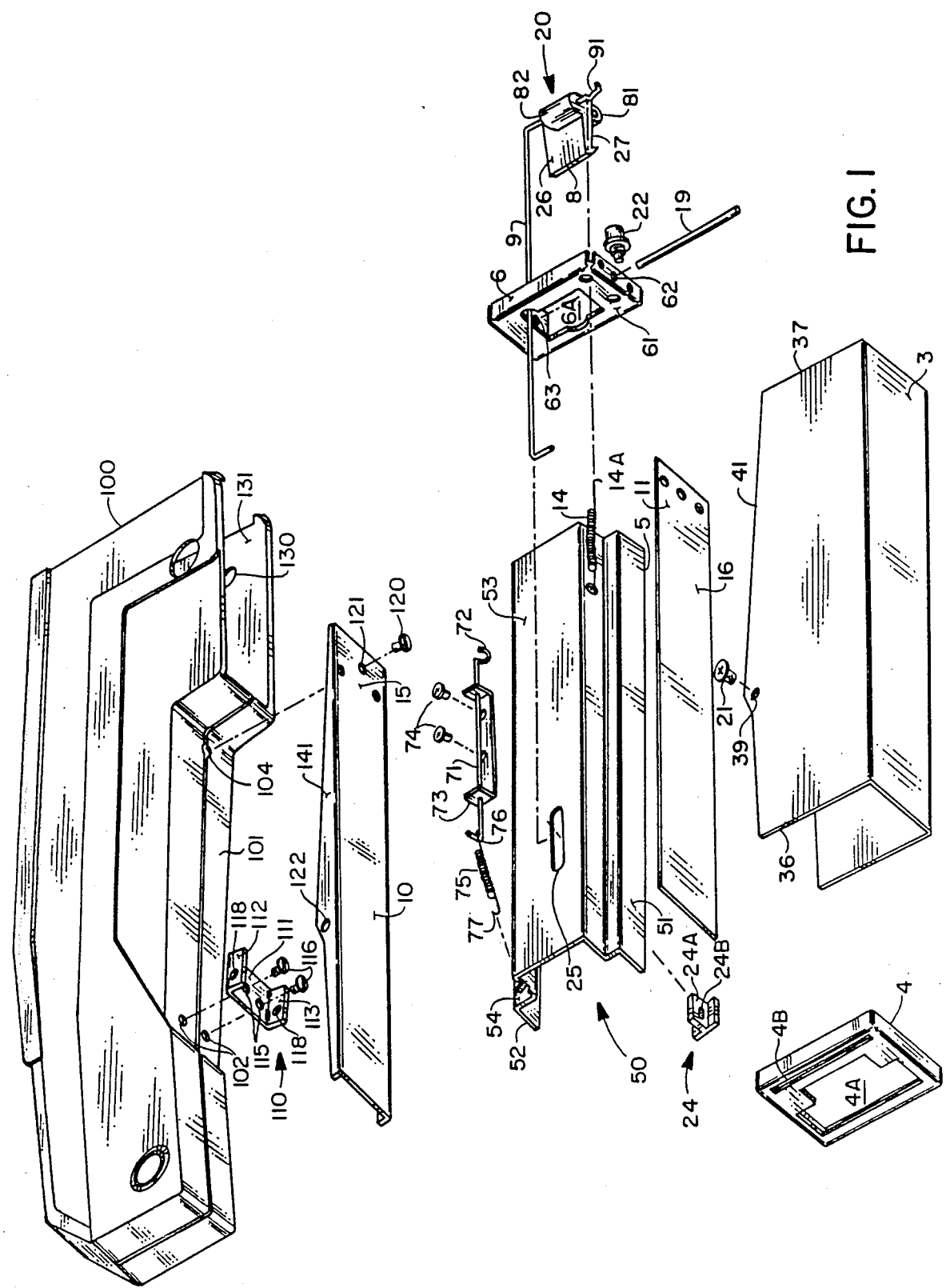
FIG. 1 is an exploded perspective view of a hand-held pay station telephone and its associated telephone dispenser, in accordance with the present invention.

Directing attention first to FIG. 1 and to FIG. 2, depicted therein are a hand-held pay station telephone 1 and its associated telephone dispenser as contemplated in the present invention. Pay station telephone or telephone 1 is of essentially unitary construction and is intended for hand-held operation. The telephone incorporates the familiar telephone functional components, including a transmitter, a receiver, a calling device and a line-matching network. However, inasmuch as the incorporated functional components of the telephone are not deemed to be limiting elements of the present invention, they will not be discussed in detail.

Also provided at one end of the telephone, as may be seen in FIG. 2, is a latch-receiving flange 2. (In a manner that will be made clear below, latch-receiving flange 2 operates in conjunction with a latching mechanism 20 to secure the telephone in the telephone dispenser when the telephone is not in use.)

Referring now to FIGS. 1 through 4, inclusive, the telephone dispenser for the above-described telephone will now be described in detail. As may be seen from the exploded perspective view of FIG. 1, the telephone dispenser of the present invention is of a generally rectangular configuration and includes a face plate 4 fabricated from a relatively thin plate of metal, plastic, or similar material. As can be readily seen in FIG. 3, face plate 4 exhibits a central opening 4A having length and width dimensions appropriate for the insertion of telephone 1 therein. The telephone may be inserted through central opening 4A into a telephone-receiving cavity 50 for retention when the telephone is not in use.

Also included in face plate 4 is a second opening or slot 4B dimensioned so as to permit the insertion of an implement, such as a typical credit card. As will be described in detail below, the insertion of a credit card through opening 4B releases the latching mechanism, thereby facilitating the removal of the telephone from the telephone dispenser. The face plate 4 is attached to a first minor side 36 of outer cover 3.

With renewed reference to FIG. 1, the telephone dispenser of the present invention further includes a dispenser channel 5 of a generally longitudinal, stepped construction. Pertinent to its stepped construction, channel 5 provides a multifaceted profile, which closely conforms to the profile of opening 4A of face plate 4. As can be seen in FIG. 4, channel 5 provides a telephone-receiving cavity 50 for telephone 1 when the telephone is inserted through opening 4A.

In accordance with the present invention, the telephone-receiving cavity 50 for telephone 1 is further defined by means of a latch plate 6. Latch plate 6 includes a face surface 61 disposed in a plane that is parallel to the plane of face plate 4 and is orthogonal to the longitudinal direction of channel 5.

Included in latch plate 6 is a hook switch 22. The hook switch 22 is spring loaded and is operated to the electrically open or "on-hook" position in response to the placement of a telephone 1 within the telephone-receiving cavity 50. When the telephone is removed from the telephone-receiving cavity 50, the spring-loaded hook switch 22 operates to electrically connect the telephone, via the telephone line cord 60, to the associated telephone equipment.

As can be seen in FIGS. 1 and 4, the telephone-receiving cavity 50 is formed by channel 5, latch plate 6 and one major side of outer cover 3. Latch plate 6 is orthogonally mounted between similar end portions 15 and 16 of a first and a second mounting bracket 10 and 11, respectively. The first mounting bracket 10 is further mounted to outer surface 52 of channel 5 and the second mounting bracket 11 is mounted to an opposite surface 51 using any convenient and appropriate means of attachment such as rivets or screws.

A latch mechanism 20 is pivotally mounted to the latch plate 6 by means of a latch pivot rod 19. In a preferred embodiment, latching mechanism 20 includes generally rectangular top and bottom major surfaces 26 and 27, respectively, and a latching arm 8. A pivot-rod-accepting eyelet member 81 extends transversely along bottom surface 27. As can be seen at FIG. 1, the pivot rod 19 is inserted through a rod-mounting hole 62, located on one side of latching plate 6, then through eyelet member 81 and finally through a similar rod-mounting hole 63 on an opposite side of latch plate 6. As can be readily appreciated, pivot rod 19 secures the latching mechanism 20 to latching plate 6. When properly mounted, latching mechanism 20 is positioned so as to extend latching arm 8 through opening 6A and into the rear portion of the telephone-receiving cavity 50.

The latching mechanism 20 further includes an eyelet member 82 extending transversely along upper surface 26. Eyelet member 82 is arranged to accept thereinto one end of a latch-release rod 9. As shown in FIGS. 1 and 4, latch-release rod 9 extends through an opening 6A of latch plate 6 and into a cavity 17 formed by an inner surface 31 of outer cover 3 and outer surface 53 of channel 5. Surface 53 of dispenser channel 5 includes a longitudinally oriented opening 25 having a first arm 24a of a generally T-shaped latch release actuator 24 extending substantially through opening 25. An aperture 24b extending through the first arm 24a of actuator 24 accepts a second and opposite end of latch-release rod 9. As can be seen in FIG. 4, latching mechanism 20 is mechanically connected to release actuator 24 via latch-release rod 9.

The latching mechanism 20 is maintained in the closed or latched position by means of an attached, elongated coil spring 14. Spring 14 is attached, at one end, to the side of channel 5 by any convenient fastening device or method. Spring 14 is attached at another end to latch-release rod 9 which extends from eyelet member 82. A hamate extension 14a of spring 14 engages and attaches to end 91 of latch-release rod 9. Elongated coil spring 14, including hamate portion 14a, form a retention mechanism for predisposing the orientation of latching mechanism 20 so that latching arm bracket 8 is positioned to interlockingly engage the latch-receiving flange 2 of telephone 1.

Also affixed to the channel 5 is an ejector mechanism that consists of an ejector push-rod 71 secured to dispenser channel 5 via a U-shaped bracket member 73. Bracket member 73 may be mounted to surface 54 of dispenser channel 5 by employing any one of the many common mounting techniques known in the art, such as the rivets 74 shown in FIG. 1. One end of the ejector push-rod 71 is formed into an ejector pin 72 which projects through an ejector aperture (not shown) in channel 5. Ejector pin 72 extends orthogonally to ejector push-rod 71 and is positioned to abut the rear portion of telephone 1 when the telephone is secured within the cavity. An opposite end of ejector push-rod 71 is attached to one end 76 of ejector spring 75. An opposite end 77 of ejector spring 75 is attached to dispenser channel 5. The ejector mechanism (specifically, push-rod 71 and ejector pin 72) operate to urge, in response to the insertion of a credit card by the telephone user, the telephone 1 in a direction out of the telephone-receiving cavity 50.

The telephone dispenser of the present invention is adapted to be installed under the armrest of an aircraft seat, or perhaps under or on the armrests of seats such as those included in limousines, boats, trains, and the like.

With renewed reference to FIG. 1 and FIG. 3, an explanation of the final assembly of the telephone dispenser, as well as, the method contemplated for the installation of the telephone dispenser to the armrest of an airline passenger seat will now be given. The armrest assembly 100 of a typical airline passenger seat is prepared for the installation of the telephone dispenser by making three small threaded bores in an underside surface 101 of the armrest assembly 100. The threaded bores consist of a side by side pair 102 drilled in a forward portion of surface 101 and a single bore 104 drilled in a rear portion of surface 101. A U-shaped dispenser mounting bracket 110, comprised of a generally planar first surface 111 and arms 112 and 113 extending orthogonally from opposite sides of first surface 111, has a pair of apertures 115 extending through surface 111 in general alignment with threaded bores 102. Dispenser bracket 110 is mounted to surface 101 of armrest 100 by aligning each aperture 115 with a respective and associated threaded bore 102. A threaded fastener 116 is then inserted through each aperture 115. Each fastener 116 engages a respective and associated threaded bore 102. The outer cover 3 of the telephone dispenser includes skewed perimeter edges 41 and 42 which are adapted to conform to surface 101 of armrest 100. Similarly, first mounting bracket 10 includes skewed perimeter edges 141 and 142, which also conform generally to surface 101.

The dispenser is prepared for mounting to the armrest 100 by installing the outer cover 3 over a subassembly consisting of channel 5 sandwiched between brackets 10 and 11 and latch plate 6. The dispenser is then mounted to armrest 100 with fasteners 21. Each fastener 21 is passed through an aperture 39 on each side of the outer cover 3, threaded through a bore 122 on each side of the first mounting bracket 10 and finally engaged to a respective threaded bore 118 of dispenser mounting bracket 110. Fasteners 21 fix the outer cover 3 to the previously mentioned subassembly and to the dispenser mounting bracket 110. With the alignment of bores 39 of the outer cover 3 and bores 122 of the first mounting bracket 10 the associated perimeter edges 41, 42 and 141, 142 of the telephone dispenser present a conforming edge to armrest surface 101.

The final assembly of the dispenser to the armrest is completed by passing a third threaded fastener 120 through aperture 121, located proximate end portion 15, of the first mounting bracket 10. Fastener 120 then engages threaded bore 104, securely fixing the telephone dispenser to armrest 100.

Obviously, the particular technique of mounting the telephone dispenser, particularly by means of fastening the dispenser to the armrest of a passenger seat, will vary substantially from aircraft to aircraft, depending upon the particular configuration of the armrest and the mounting environment. Therefore, it can be appreciated that the mounting technique of the present invention can be modified, without departing from the scope of the invention to conform to armrests encountering different mounting environments than the armrest just described.

A more thorough understanding of the present invention may be had by means of the following description, which shall be offered again in conjunction with the above-described drawings. Particular attention will presently be directed to the manner in which the telephone is placed into the telephone dispenser, latched and retained in the telephone-receiving cavity 50, and then released for use by a telephone user.

With the telephone in the user's hand, the line cord 60, will extend from the telephone 1 into the telephone-receiving cavity 50 and will exit the cavity by means of opening 6A in latch plate 6. As can be seen in FIG. 4, the user inserts the end of the telephone that includes the line cord into the telephone dispenser by placing the telephone through opening 4A of face plate 4. The line cord 60 will be drawn through by means of an associated cord or take-up, reel (not shown). The telephone is then manually urged into the dispenser through opening 4A of face plate 4 and into the telephone-receiving cavity 50. As the telephone travels within the telephone-receiving cavity 50, the cord end of the telephone contacts the ejector pin 72. Any further movement of the telephone toward the latching mechanism 20 causes the ejector pin 72 and the push-rod 71 to follow the telephone's movement, thereby tensioning ejector spring 75. Adequate pressure of the telephone latch-receiving flange 2 against the spring-loaded latching mechanism 20, specifically, against inclined edge 92 of latching arm 8, will initially cause the latching mechanism 20 to pivot in a direction that causes latching arm 8 to pivot upward some distance from the latch-receiving flange 2 and to ride over the top surface of latch-receiving flange 2. As the telephone is further inserted into the telephone-receiving cavity 50, latching arm 8 will fall off the latch-receiving member 2 top surface. At this point, coil spring 14 will pull latching arm 8 downward, locking latching arm 8 against latch-receiving flange 2. As can be seen in FIG. 5, the telephone is held securely against the latching mechanism 20 by a tension force supplied by spring 75 to ejector push-rod 71 and ejector pin 12. The telephone is thereby retained in its associated telephone dispenser, ready for subsequent use.

Now with reference to FIG. 6, an explanation of the extraction of the telephone from the dispenser will be given. Should a telephone user desire to use the telephone, he would insert an implement, such as a credit card 70, through the opening 4B in face plate 4. Once inserted through opening 4B, the credit card will then pass into cavity 17 and be guided in the direction of the first arm 27 of latch-release actuator 24. Moderate exertion by the user against the credit card 70 forces the latch-release actuator back, thereby overcoming the spring tension maintained by spring 14. As a result, latching mechanism 20 is caused to rotate about pivot rod 19, causing latching arm 8 to pivot upward, disengaging latching arm 8 from latch-receiving flange 2. At this point, ejector pin 72 will be forced in a forward direction against the rear portion of telephone 1, thereby causing the telephone to be forced forward and to protrude from opening 4A of the dispenser. That is to say, ejector spring 75 is so tensioned that ejector pin 72, via ejector push-rod 71, delivers pressure to the telephone in a direction that, absent the opposing force applied by the latching arm 8, urges the telephone out of the dispenser. The user may now grasp the telephone and manually withdraw it from the telephone dispenser.

By means of a credit-card reader that may be included in the telephone, the user obtains access to the associated telephone system. A pushbutton calling device included in the telephone permits the user to secure a connection with the desired telephone station. The particular details of the operation of the telephone itself to secure the telephone connection do not form a part of the present invention and, therefore, will not be described in more elaborate detail.

It is, however, useful to underscore some of the salient attributes of the subject Pay Station Telephone and Dispenser. Its compact design and low-profile form factor permit the installation of the telephone dispenser, under the armrests of seats of crowded commercial vehicles, where space is at a premium. A more bulky and cumbersome outline would likely militate against such convenient installation and discourage use of the on-board pay telephone. The compact mechanical design of the telephone dispenser itself significantly contributes to the objective of providing a low-profile, readily installed apparatus. In addition, the fact that the pay station telephone dispenser is credit-card actuated guards against the inadvertent release of the telephone handset in the cramped quarters typical of, for example, a commercial airliner.

Furthermore, it will be obvious to those skilled in the art that numerous modifications to the present invention can be made without departing from the scope of the invention as defined by the appended claims. In this context, it should be recognized that the essence of the invention resides in a low-profile, easily installed dispenser that defines a receiving cavity for a hand-held pay station telephone which is mountable to the armrest of a passenger seat of a commercial vehicle, such as a commercial airliner.

What is claimed is:

1. In combination:
   a hand-held telephone and latch receiver (2);
   an elongated, substantially enclosed telephone dispenser including a telephone receiving cavity adapted to receive said telephone in response to the manual placement of said telephone within said cavity;
   a latch (20) operable to automatically engage said latch receiver to maintaining said telephone within said telephone receiving cavity; and
   means for mounting said telephone dispenser to the armrest of a passenger seat of a vehicle.

2. The combination as claimed in claim 1, wherein:
   said latch receiver comprises a projection extending from an exterior surface of said hand-held telephone.

3. The combination as claimed in claim 2, wherein:
   said projection extending from said hand-held telephone exterior surface comprises a generally rectangular latch-receiving flange extending transversely across a top surface of said telephone.

4. The combination as claimed in claim 3, wherein:
   said latch-receiving flange is an integrally molded portion of said hand-held telephone.

5. The combination as claimed in claim 1, wherein:
   said telephone receiving cavity included in said telephone dispenser is formed in part by a dispenser channel.

6. The combination as claimed in claim 5, wherein:
   said dispenser channel is of stepped construction.

7. The combination as claimed in claim 6, wherein:
   there is further included a face plate affixed to said dispenser channel, said face plate including an opening therein adapted to facilitate the placement of said hand-held telephone through said opening into said telephone receiving cavity.

8. The combination as claimed in claim 7, wherein:
   said telephone receiving cavity included in said telephone dispenser is further formed by a latch plate extending across an end of said dispenser channel opposite said face plate.

9. The combination as claimed in claim 8, wherein:
   said latch plate further includes a hook switch mounted on said latch plate and operable in a first mode in response to the placement of said handheld telephone within said telephone receiving cavity of said telephone dispenser and operable in a second mode in response to the removal of said hand-held telephone from said cavity.

10. The combination as set forth in claim 5, wherein:
    said latch is pivotally mounted to said dispenser channel.

11. The combination as claimed in claim 10, wherein:
    said pivotally mounted latch further includes a telephone engaging portion adapted to interlockingly engage said telephone latch-receiving flange.

12. A combination as claimed in claim 11, wherein:
    said telephone engaging portion of said pivotally mounted latch extends into said telephone receiving cavity of said telephone dispenser.

13. The combination as claimed in claim 10, wherein:
    said pivotally mounted latch is retained in a latched condition by a spring tension device.

14. The combination as claimed in claim 13, wherein:
    said spring tension device comprises a coil spring.

15. The combination as claimed in claim 14, wherein:
    said pivotally mounted latch further includes a latch release actuator.

16. The combination as claimed in claim 15, wherein:

said latch release actuator is positioned adjacent to said face plate and said face plate further includes an opening therein sized so as to accept a credit card.

17. The combination as claimed in claim 16, wherein:
said latch release actuator is mechanically connected to said pivotally mounted latch and is adapted for operation in response to the manual placement of a credit card against said latch release actuator to disable said latch.

18. The combination as claimed in claim 5, wherein:
there is further included an ejector adapted to urge said hand-held telephone from within said telephone receiving cavity.

19. The combination as claimed in claim 18, wherein:
said ejector comprises resilient means adapted to urge said telephone from within said telephone receiving cavity.

20. The combination as claimed in claim 19, wherein:
said resilient means further includes a rigid portion projecting into said dispenser channel.

21. The combination as claimed in claim 20, wherein:
said resilient means comprises a coil spring.

22. The combination as claimed in claim 21, wherein:
said rigid portion projecting into said dispenser channel comprises an ejection pin formed on one end of an ejector push-rod, the opposite end of said ejector push-rod affixed to said coil spring.

23. The combination as claimed in claim 5, wherein:
said telephone dispenser mounting means includes a first mounting bracket attached to said dispenser channel.

24. The combination as claimed in claim 23, wherein:
there is further provided a U-shaped dispenser bracket attached to said armrest and said U-shaped dispenser bracket is adapted to receive and retain said first mounting bracket, thereby securing said telephone dispenser to said armrest.

25. The combination as claimed in claim 24, wherein:
said dispenser bracket is mounted to an underside surface of said armrest opposite a surface used by a seated passenger to rest his or her arm.

26. The combination as claimed in claim 25, wherein:
said first mounting bracket includes a perimeter edge generally conformal to said armrest's underside surface.

27. In combination:
a hand-held telephone including a latch-receiving flange; and
a telephone dispenser including an elongated substantially enclosed telephone receiving cavity having first and second ends said cavity being formed by a dispenser channel of stepped construction having at said first end thereof a latch plate, said latch plate having a hook switch and a latch pivotally mounted to said channel, said latch including a telephone engaging portion extending into said channel and adapted to interlockingly engage said latch-receiving flange, and said telephone dispenser further including a first mounting bracket attached to said dispenser channel;
a coil spring attached between said channel and said latch normally retaining said latch in the latched condition and a latch release actuator adapted to be actuated in response to the placement of a implement against said latch release actuator to release said latch and thereby disengage said projecting telephone engaging portion from said latch-receiving flange of said telephone; and
a face plate formed upon said second end of said dispenser, including a first opening adapted to permit the placement or alternatively the extraction of said telephone into said dispenser cavity and a second opening adapted to permit the positioning of the implement against said telephone latch release actuator;
resilient ejecting means adapted to urge said telephone out of said cavity and through said face plate first opening so that said telephone can be easily grasped, said resilient ejecting means primarily comprising a spring; and
a dispenser mounting bracket attached to an underside surface of a passenger seat armrest found on a vehicle, said dispenser mounting bracket adapted to accept and retain said first mounting bracket, fixing said telephone dispenser to said armrest.

* * * * *